United States Patent [19]

Holt

[11] Patent Number: 5,513,224
[45] Date of Patent: Apr. 30, 1996

[54] FILL LEVEL INDICATOR FOR SELF-TIMED FIFO

[75] Inventor: Craig S. Holt, Cohasset, Mass.

[73] Assignee: Codex, Corp., Mansfield, Mass.

[21] Appl. No.: 122,740

[22] Filed: Sep. 16, 1993

[51] Int. Cl.[6] .............................. H04L 7/00; G11C 13/00
[52] U.S. Cl. .................... 375/372; 375/371; 395/250; 370/105.3
[58] Field of Search ............................ 375/118; 370/102, 370/105.3; 364/239.6, 239.1, 239.5, 239.51, 939.1, 939.4, 939.81, 939.6

[56] References Cited

U.S. PATENT DOCUMENTS

| | | | |
|---|---|---|---|
| 4,222,102 | 9/1980 | Jensen et al. | 364/200 |
| 4,236,225 | 11/1980 | Jensen et al. | 364/900 |
| 4,486,854 | 12/1984 | Yuni | 364/900 |
| 4,583,163 | 4/1986 | Kobayashi et al. | 364/200 |
| 4,598,362 | 7/1986 | Kinjo et al. | 364/200 |
| 4,839,866 | 6/1989 | Ward et al. | 365/221 |
| 4,891,788 | 1/1990 | Kreifels | 375/118 |
| 5,083,269 | 1/1992 | Syobatake et al. | 370/94.1 |
| 5,365,552 | 11/1994 | Astle | 375/118 |

Primary Examiner—Stephen Chin
Assistant Examiner—T. Ghebretinsae
Attorney, Agent, or Firm—Robert D. Atkins

[57] ABSTRACT

A FIFO uses a fill indicator circuit to indicate a fill status and provide control signals to a data source and data sink to cease operation. A serial string of FIFO cells propagates data from input to output by sending request and acknowledge signals between adjacent cells. The request signal initiates data transfer to the next logical cell and the acknowledge signal indicates completion of the transfer. The fill indicator has one cell for each FIFO cell for monitoring the request and acknowledge signals looking for predetermined state sequences to indicate whether each FIFO cell is full or empty.

9 Claims, 4 Drawing Sheets

FILL LEVEL INDICATOR FOR SELF-TIMED FIFO

BACKGROUND OF THE INVENTION

The present invention relates in general to first-in-first-out (FIFO) circuits and, more particularly, to a FIFO operating with a fill level indicator.

Many data processing and communication applications, for example computer networks, require data communication between devices operating asynchronously. One problem with asynchronous communication is that data transmission between data source and data sink must be carefully controlled to prevent loss of data. If the data source transmits information faster than the data sink can accept, information may be lost. Alternately, if the data sink accepts information faster than the data source can provide, the data sink may capture the same data twice. Hence, there must be control over asynchronously transmitted data.

One solution found in the prior art involves handshaking between the data source and data sink. The data source does not send data until the data sink is ready. Likewise, the data sink does not read until the data source indicates that valid data is present. The handshaking procedure tends to slow the communication process and result in inefficient operation because the higher operating speed of the data source or data sink cannot be fully utilized.

Another solution is to insert an asynchronous buffer, e.g. FIFO, between the data source and data sink. The data source may dump data into the buffer at its nominal operating speed. The data sink reads from the buffer at will. The inherent limitation in the buffer approach is its finite length. If the data source is faster than the data sink for some period of time, then the buffer may overflow causing loss of data. If the data sink is faster than the data source, the buffer may become empty and the data sink may read invalid data. Hence, the data source and sink must have feedback from the buffer to help regulate when to enable and disable the flow of data.

Unfortunately, it is difficult to obtain reliable indication of fill status from an asynchronous buffer. If the buffer is implemented as a dual-port RAM with pointers to the first and last location, then a subtractor circuit could compute the difference between the pointers indicating full status of the buffer. However since either pointer can change asynchronously, there is some chance that the data source or data sink will attempt to read the value while it is changing resulting in a significant error.

Hence, a need exists to detect the fill status of an interface buffer between the data source and data sink in a manner that is not subject to serious errors common in asynchronous systems.

DETAILED DESCRIPTION OF THE PREFERRED EMBODIMENT

Figure 1:
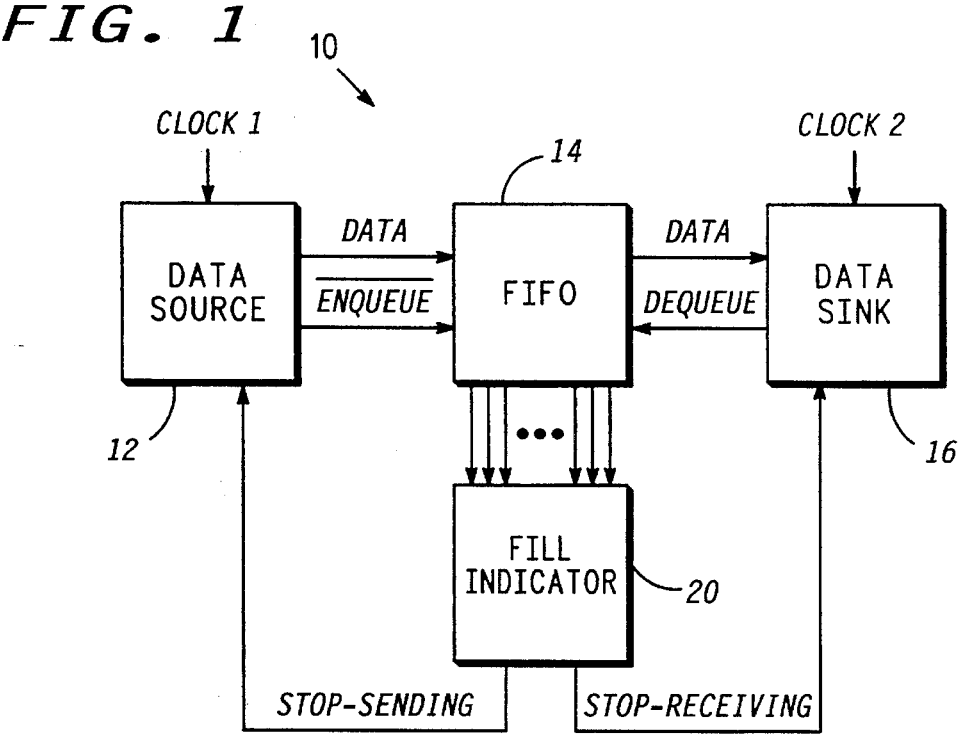
FIG. 1 is a block diagram illustrating a FIFO with fill indicator.

A communication circuit 10 is shown in FIG. 1 suitable for manufacturing as an integrated circuit using conventional integrated circuit processes. A data source 12 operating with CLOCK1 transmits data to FIFO 14 for storage. The data signal may comprise any width of logical word. A control signal $\overline{\text{ENQUEUE}}$ indicates to FIFO 14 that data is valid for storage. FIFO 14 shifts data received at its input in a first-in-first-out fashion along a string of serially coupled data storage cells to an output. FIFO 14 is self-timed where receipt of data in one cell triggers transfer to the next cell if space is available. Data sink 16 operating with CLOCK2 receives data from FIFO 14 for further processing. CLOCK1 is asynchronous with respect to CLOCK2. A control signal DEQUEUE indicates to FIFO 14 that data has been read allowing the remaining data in the queue to shift toward the output. With different clock sources, data source 12 and data sink 16 may operate asynchronously. Hence, FIFO 14 functions as intermediate storage until data sink 16 accepts the data.

As part of the present invention, fill indicator 20 receives control signals from FIFO 14 and provides status indicators STOP_SENDING and STOP_RECEIVING to data source 12 and data sink 16, respectively. The STOP_SENDING signal is asserted when FIFO 14 has say two or three cells available for data. The STOP_RECEIVING signal is asserted when FIFO 14 has say two or three cells with data remaining. The early STOP_SENDING and STOP_RECEIVING indicators allow data source 12 and data sink 16 plenty of time to disable operation before data runs out or overflows.

Figure 2:
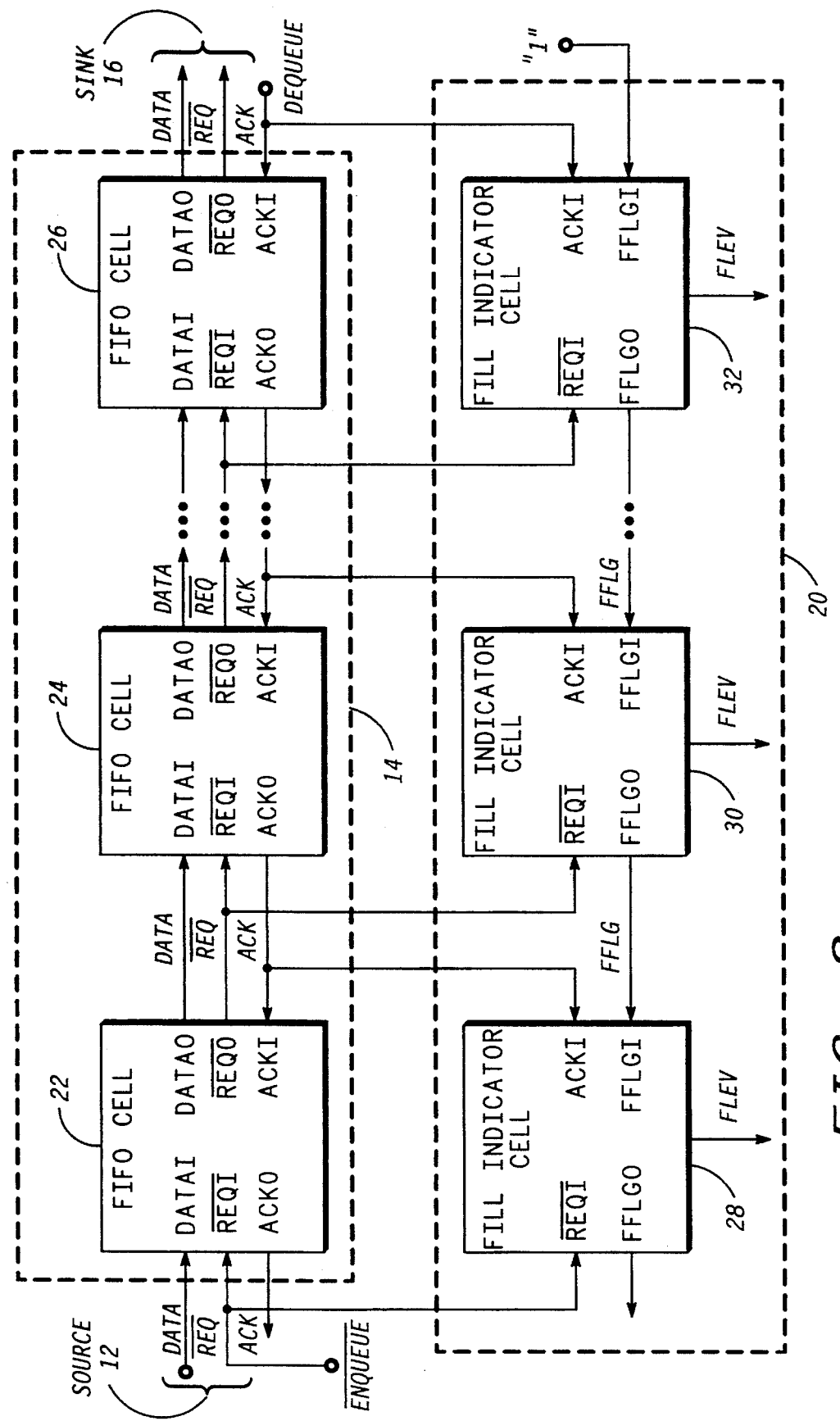
FIG. 2 is a block diagram illustrating adjacent cells of the FIFO of FIG. 1.

Further detail of the interconnection between FIFO 14 and fill indicator 20 is shown in FIG. 2 with FIFO 14 including FIFO cell 22 receiving a data word from data source 12. The data output of FIFO cell 22 is coupled to the data input of FIFO cell 24. The last FIFO cell 26 has a data output coupled to the input of data sink 16. FIFO cells 22–26 provide control signals $\overline{\text{REQ}}$ (request) and ACK (acknowledge) to fill indicator cells 28, 30 and 32, respectively. Fill indicator cells 28–32 pass FFLG (full flag) signals as shown. The FLEV (fill level) outputs from fill indicator cells 28–32 provide the desired fill status.

Note the convention in naming signals running between iterative cells. For example, the signal running between fill indicator cells such as cells 28 and 30 is generically referred to as FFLG. The output from cell 30 producing FFLG is labeled FFLGO, and the input that FFLG goes to is labeled FFLGI. $\overline{\text{REQ}}$ and ACK signals are labeled similarly. In general, a signal is considered to be asserted at logic one, and negated at logic zero.

Figure 3:
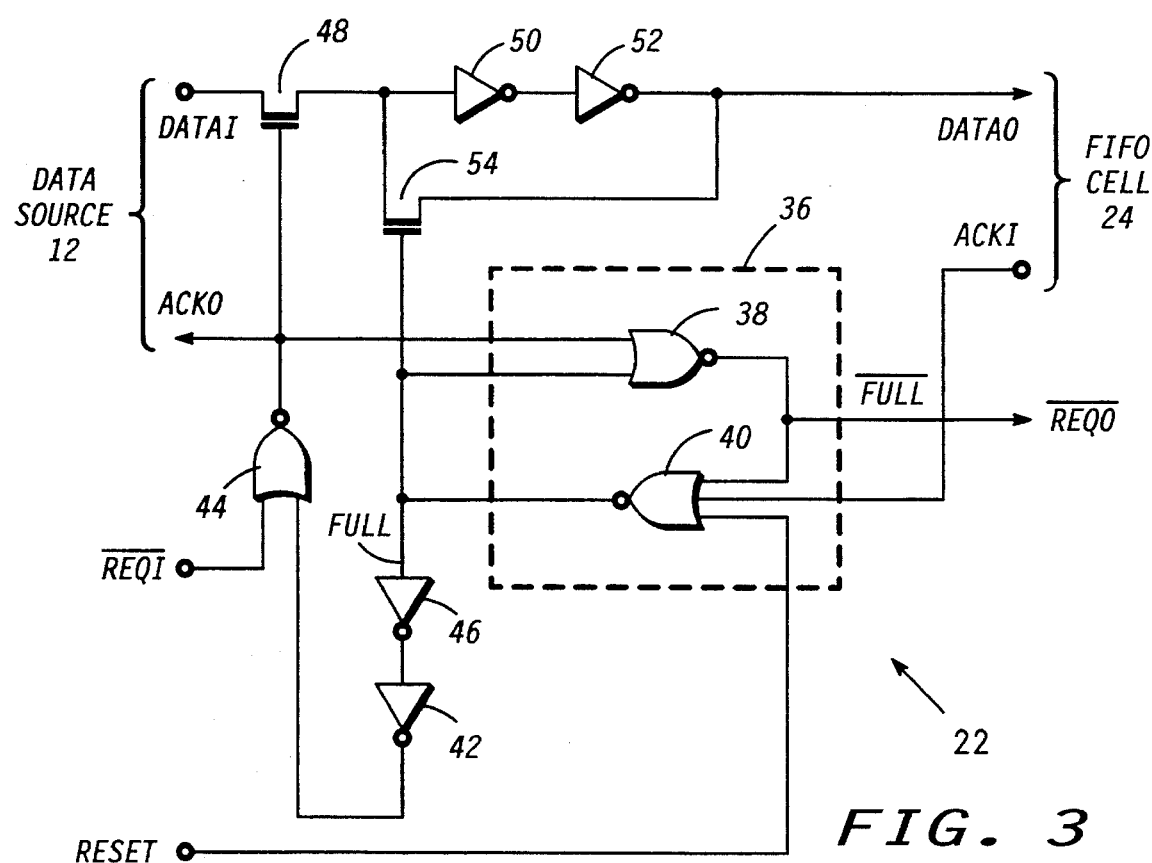
FIG. 3 is a schematic diagram illustrating one FIFO cell of FIG. 2.

FIFO cell 22 is illustrated in FIG. 3 as representative of the other FIFO cells. The width of the data signal shown is only one bit, though it could be any width. The circuit comprising elements 48–54 would be repeated for each bit in the data word.

Assume FIFO cell 22 begins in an empty state. The FULL signal at the output of RS latch 36 comprising NOR gates 38 and 40 is logic zero. Inverters 42 and 46 provide delay to avoid timing problems in the self-timed logic. To move data into FIFO cell 22, the $\overline{\text{ENQUEUE}}$ is asserted low and comes in as $\overline{\text{REQI}}$. Since both inputs to NOR gate 44 are low its output goes to logic one thereby enabling transistor 48. The data signal passes through transistor 48 to inverters 50 and 52. The logic one output from NOR gate 44 also asserts the ACKO pulse as logic one to data source 12 acknowledging the receipt of the data. The logic one from NOR gate 44 also sets the output of RS latch 36 such that the FULL signal becomes logic one and the $\overline{\text{FULL}}$ signal goes to logic zero. The logic one FULL signal enables transistor 54 to latch the data across inverters 50 and 52. The logic one FULL signal also causes the output of NOR gate 44 to return to logic zero, whereby ACKO returns to logic zero and turns off transistor 48. Upon receiving the ACKO signal, data source 12 returns the $\overline{\text{REQI}}$ signal to logic one.

The $\overline{\text{FULL}}$ signal becomes the $\overline{\text{REQO}}$ signal to FIFO cell 24 in preparation for the next move of the data word. If space is available in FIFO cell 24 and the transfer is successful, its ACKO pulse returns to FIFO cell 22 as the ACKI pulse to reset RS latch 36. The FULL signal returns to logic zero making FIFO cell 22 available for more input data. The remaining FIFO cells are connected in a similar manner to accomplish the first-in-first-out operation. The $\overline{\text{FULL}}$ signal from FIFO cell 26 goes to data sink 16 to indicate data is ready to be read from FIFO 14. The DEQUEUE signal from data sink 16 becomes the ACKI signal for FIFO cell 26. Thus, data input to FIFO cell 22 ripples to the end of FIFO 14 where it is made available to data sink 16.

Figure 4:
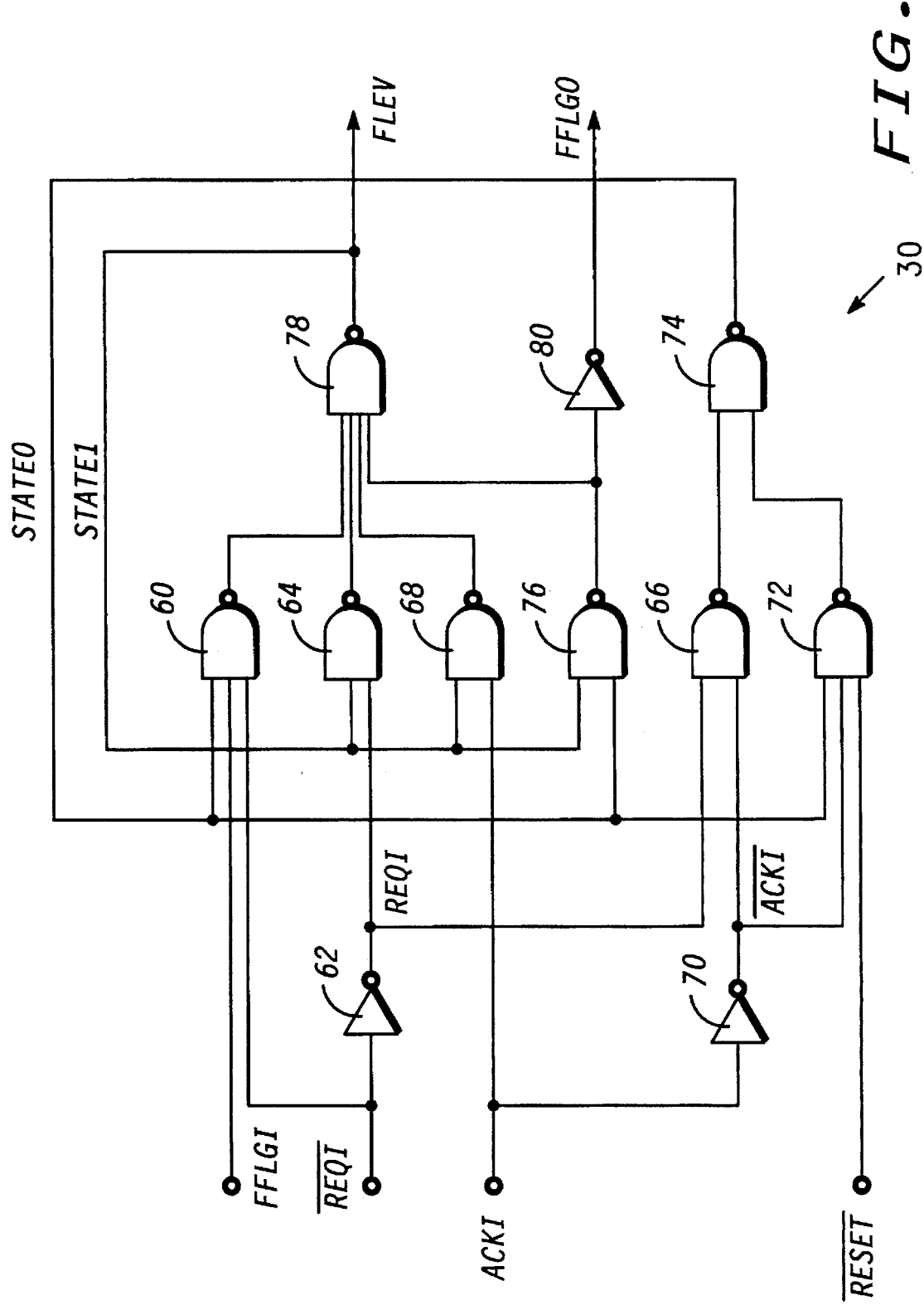
FIG. 4 is a schematic diagram illustrating one cell of the fill indicator of FIG. 2.

A key feature of the present invention is provided by fill indicator 20 to monitor the state changes of each FIFO cell and provide FLEV status signals indicating the fill status of FIFO 14. Turning to FIG. 4, fill indicator cell 30 is shown as representative of the other cells. The FFLGI signal from FFLGO of the previous fill indicator cell, e.g. cell 32, is applied to one input of NAND gate 60. The $\overline{\text{REQI}}$ signal from $\overline{\text{REQ}}$ of FIFO cell 22 is applied to a second input of NAND gate 60. The $\overline{\text{REQI}}$ signal is also inverted by inverter 62 and applied to inputs of NAND gates 64 and 66. The ACKI pulse is applied to one input of NAND gate 68 and through inverter 70 to inputs of NAND signal from initialization logic (not shown). NAND gate 74 receives its inputs from NAND gates 66 and 72. The output of NAND gate 74 noted as STATE0 is coupled to inputs of NAND gates 60, 76 and 72. NAND gate 78 receives its inputs from NAND gates 60, 64, 68 and 76. The output of NAND gate 78 noted as STATE1 is coupled to inputs of NAND gates 64, 68 and 76. The output of NAND gate 76 also provides the FFLGO signal following inversion by inverter 80.

Figure 5:
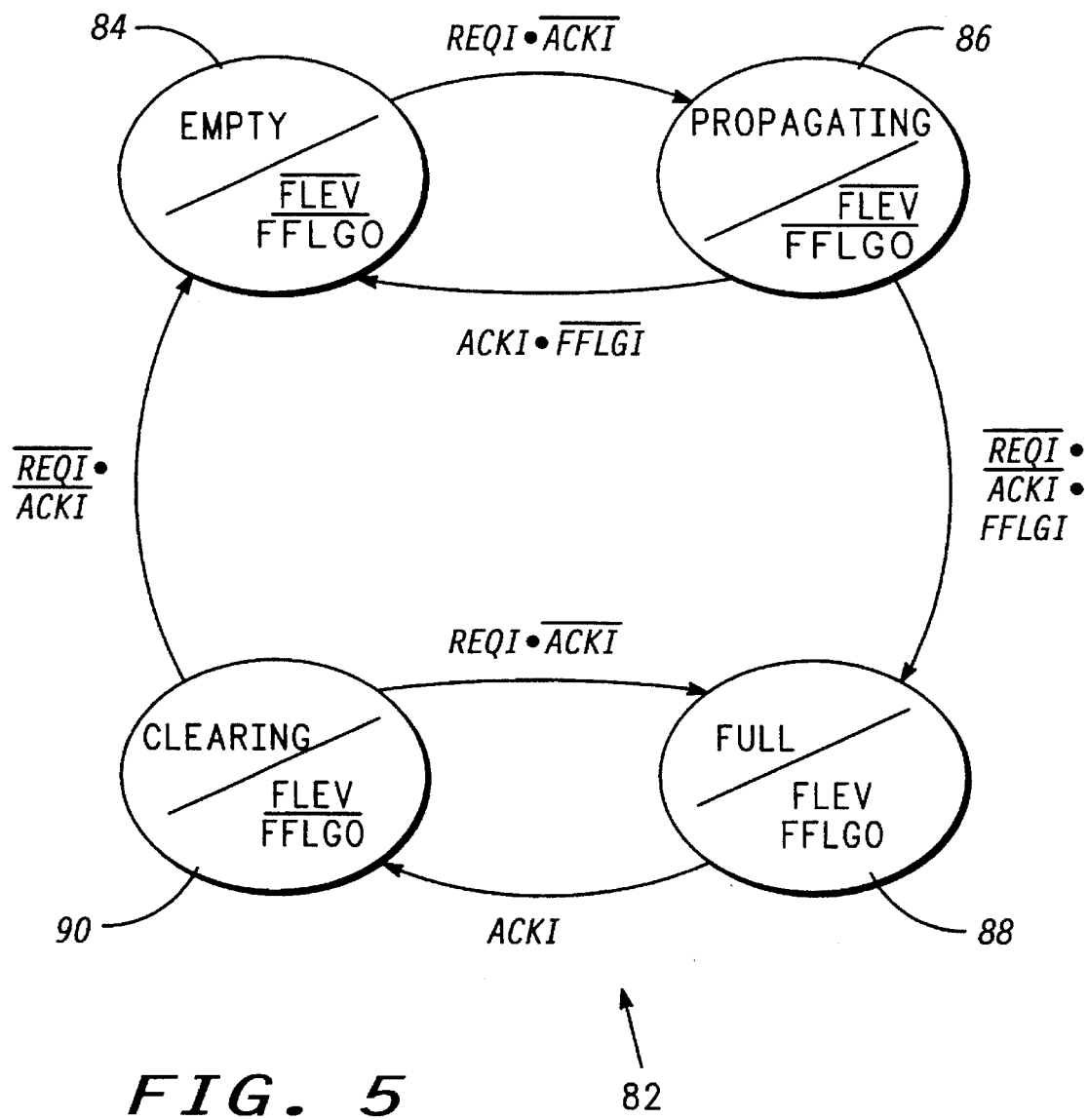
FIG. 5 is a state diagram illustrating the operation of the fill indicator cell of FIG. 4.

The operation of fill indicator cell 30 may best be understood in combination with state diagram 82 shown in FIG. 5. State diagram 82 is a four-state asynchronous state machine which may be implemented as shown in FIG. 4. It should be readily apparent that other logic configurations although not specifically shown may achieve the same result and are considered within the scope of this invention. State diagram 82 is asynchronous in that it changes state upon the condition between the states becoming true, without reference to any clock. In FIG. 5 and the following, a dot „e„ refers to the logical AND operator, $\overline{\text{REQI}}$ refers to the inverse of signal REQI, $\overline{\text{ACKI}}$ refers to the inverse of signal ACKI, and $\overline{\text{FFLGI}}$ refers to the inverse of signal FFLGI. The states in state diagram 82 are labeled with the state name, followed by a slash "/", followed by the output of the state. An output of FLEV means that the FLEV signal is at logic one and an output of $\overline{\text{FLEV}}$ indicates that the FLEV signal is at logic zero. The same notation applies for output FFLGO.

State 84 is the empty state indicating no data in the corresponding FIFO cell. In the empty state both outputs FLEV and FFLGO are at logic zero, and STATE0 and STATE1 are at logic zero. When REQI is at logic one and ACKI is at logic zero, satisfying the transition condition REQI ● $\overline{\text{ACKI}}$, state diagram 82 switches to propagating state 86. Propagating state 86 corresponds to STATE0 at logic one and STATE1 at logic zero.

For example, consider the operation of fill indicator cell 30 in FIG. 4 when it is in the empty state with REQI at logic zero, indicating no request, and ACKI at logic zero, indicating that the next data cell is not acknowledging data transfer, i.e. any previous transfer of data out of FIFO cell 24 is complete. NAND gate 60 receives logic zero from STATE0 and provides a logic one to NAND gate 78. NAND gate 64 receives a logic zero from STATE1 and provides another logic one to NAND gate 78. The inputs to NAND gate 68 are logic zeroes from STATE1 and ACKI producing a logic one output. Likewise, the output of NAND gate 76 is logic one with logic zeroes from STATE0 and STATE1. NAND gate 66 receives a logic zero from REQI and provides a logic one to NAND gate 66. NAND gate 72 receives a logic zero from STATE0 and provides another logic one to NAND gate 66. Both NAND gates 78 and 66 have all inputs at logic one and therefore produce logic zero outputs, so state diagram 82 remains steady state in empty state 84.

Now assume ACKI remains at logic zero and REQI changes to logic one, which satisfies the transition condition REQI ● $\overline{\text{ACKI}}$. This occurs when the FIFO cell is receiving a request to write data and any previous transfer of data out of this FIFO cell has been completed. NAND gate 66 checks the combination of REQI and $\overline{\text{ACKI}}$ true and provides a logic zero output to NAND gate 74. The output of NAND gate 74 goes to logic one and changes STATE0 accordingly. Despite these changes, the other NAND gates 60–72 continue to produce logic one outputs since each still has at least one input at logic zero. In particular, NAND gate 60 gained a logic zero input from $\overline{\text{REQI}}$ before its STATE0 input changed to logic one, and NAND gates 64 and 76 each have a logic zero input from STATE1. Hence state diagram 82 has moved to propagating state 86 with STATE0 at logic one and STATE1 at logic zero. FIFO cell 24 now contains data, although the fill level output signal FLEV is still low because the data may be just rippling through this cell.

Continuing with FIG. 5, after a short time REQI will go to logic zero, indicating that the transfer of data into FIFO cell 24 is complete. One of two cases will occur. If the next FIFO cell is empty, FFLGI will be at logic zero, and ACKI will go to logic one, indicating that the next FIFO cell is accepting the data from FIFO cell 24. This case satisfies the condition ACKI ● $\overline{\text{FFLGI}}$, causing state diagram 82 to switch back to empty state 84. Data was merely passing through the corresponding FIFO cell. Note that both empty state 84 and propagating state 86 provide a logic zero FLEV status indicating that the corresponding FIFO cell does not contain data, so the propagation of data through the FIFO cell did not produce any undesired pulse in the FLEV output.

Returning to propagating state 86, a second case occurs if the next cell was already occupied with data. The next fill indicator cell provides a logic one on FFLGI, and no ACKI arrives because the next FIFO is already full and cannot acknowledge more data. Hence when REQI goes to logic zero, the transition condition $\overline{\text{REQI}}$ ● $\overline{\text{ACKI}}$ ● FFLGI is satisfied. State diagram 82 switches to full state 88 corresponding to STATE0 and STATE 1 as logic one. The full flag output FFLGO and the fill level output FLEV are logic one. Once data moves out of the next FIFO cell with ACKI asserted at logic one, state diagram 82 jumps to clearing state 90. The clearing state 90 corresponds to STATE0 at logic zero and STATE 1 as logic one. FLEV is logic one. If data comes right back into FIFO cell 24 again, i.e. REQI and $\overline{\text{ACKI}}$ at logic one, then state diagram 82 returns to full state 88. Hence if FIFO cells 28–32 are occupied with data, and one word of data is read from the FIFO causing all other words to move over to the next cell, fill indicator cell 30 moves briefly to clearing state 90 and then returns to full state 88 as data moves in from FIFO cell 22. Since both clearing state 90 and full state 88 produce logic one on the FLEV output, there is no undesired pulse in the FLEV output. In clearing state 90, if no data is waiting in FIFO cell 22 to move into FIFO cell 24, then the transition condition $\overline{REQI} \bullet \overline{ACKI}$ is satisfied, and state diagram 82 moves to empty state 84.

Once the FLEV status signal is set at logic one or logic zero corresponding to whether or not data exists in the FIFO cells, the STOP_SENDING and STOP_RECEIVING control signals shown in FIG. 1, which may be selected as any one of the FLEV status signals to disable data source 12 and data sink 16, respectively.

While specific embodiments of the present invention have been shown and described, further modifications and improvements will occur to those skilled in the art. It is understood that the invention is not limited to the particular forms shown and it is intended for the appended claims to cover all modifications which do not depart from the spirit and scope of this invention.

What is claimed is:

1. A circuit, comprising:

first means for shifting data received at an input along a string of serially coupled data storage cells to an output where each of said data storage cells provides a request control signal indicating a request for data transfer to a first adjacent cell and an acknowledge control signal acknowledging data transfer from a second adjacent cell; and second means coupled for receiving said request and acknowledge control signals and determining fill status of said data storage cells in a predetermined manner and providing a fill level signal accordingly, said second means includes a string of serially coupled fill indicator cells where a first fill indicator cell receives a full flag input signal from a second fill indicator cell adjacent to said first fill indicator Cell, said first fill indicator cell including, (a) a first NAND gate having first, second and third inputs and an output, said first input receiving a first state signal of said first fill indicator cell, said second input receiving said full flag input signal, said third input receiving said request control signal, (b) a second NAND gate having first and second inputs and an output, said first input receiving a second state signal of said first fill indicator cell, said second input receiving an inverted request control signal, (c) a third NAND gate having first and second inputs and an output, said first input receiving said second state signal of said first fill indicator cell, said second input receiving said acknowledge control signal, (d) a fourth NAND gate having first and second inputs and an output, said first input receiving said first state signal of said first fill indicator cell, said second input receiving said second state signal of said first fill indicator cell, said output providing a second full flag output signal, and (e) a fifth NAND gate having first, second, third and fourth inputs and an output, said first input being coupled to said output of said first NAND gate, said second input being coupled to said output of said second NAND gate, said third input being coupled to said output of said third NAND gate, said fourth input being coupled to said output of said fourth NAND gate, said output providing said fill level signal and said second state signal of said first fill indicator cell.

2. The circuit of claim 1 wherein said first fill indicator cell further includes:

a sixth NAND gate having first and second inputs and an output, said first input receiving said inverted request control signal of said first fill indicator cell, said second input receiving an inverted acknowledge control signal;

a seventh NAND gate having first, second and third inputs and an output, said first input receiving said first state signal of said first fill indicator cell, said second input receiving said inverted acknowledge control signal, said third input receiving a reset control signal; and an eighth NAND gate having first and second inputs and an output, said first input being coupled to said output of said sixth NAND gate, said second input being coupled to said output of said seventh NAND gate, said output providing said first state of said first fill indicator cell.

3. A method of determining fill status of a data storage cell, comprising the steps of:

establishing an empty state indicating that the data storage cell is available for data input;

monitoring status of request and acknowledge control signals where said request control signal indicates a request for data transfer to a first adjacent data storage cell and said acknowledge control signal acknowledges data transfer to a second adjacent data storage cell;

shifting from said empty state to a propagation state when said request control signal and an inverted acknowledge control signal are asserted; and shifting from said propagation state to a full state when an inverted request control signal and said inverted acknowledge control signal and a full flag signal are asserted, where said full state provides the fill status and a full flag signal to the adjacent cell.

4. The method of claim 3 further comprising the step of shifting from said full state to a clearing state when said acknowledge control signal is asserted, where the clearing state provides the fill status.

5. The method of claim 4 further comprising the step of shifting from said clearing state to said empty state when said inverted request control signal and said inverted acknowledge control are asserted.

6. The method of claim 5 further comprising the step of shifting from said clearing state to said full state when said request control signal and said inverted acknowledge control are asserted.

7. The method of claim 6 further comprising the step of shifting from said propagation state to said empty state when said acknowledge control signal and an inverted full flag signal are asserted.

8. A circuit, comprising:

first means for shifting data received at an input along a string of serially coupled data storage cells to an output where each of said data storage cells provides a request control signal indicating a request for data transfer to a first adjacent cell and an acknowledge control signal acknowledging data transfer from a second adjacent cell; and a string of serially coupled fill indicator cells where a first fill indicator cell receives a full flag signal from a second fill indicator cell adjacent to said first fill indicator cell, said first fill indicator cell including, (a) a first NAND gate having first, second and third inputs and an output, said first input receiving a first state signal of said first fill indicator cell, said second input receiving said full flag input signal, said third input receiving said request control signal, (b) a second NAND gate having first and second inputs and an output, said first input receiving a second state signal of said first fill indicator cell, said second input receiving an inverted request control signal, (c) a third NAND gate having first and second inputs and an output, said first input receiving a second state signal of said first fill indicator cell, said second input receiving said acknowledge control signal, (d) a fourth NAND gate having first and second inputs and an output, said first input receiving said first state signal of said first fill indicator cell, said second input receiving said second state signal of said first fill indicator cell, said output providing a second full flag output signal, and (e) a fifth NAND gate having first, second, third and fourth inputs and an output, said first input being coupled to said output of said first NAND gate, said second input being coupled to said output of said second NAND gate, said third input being coupled to said output of said third NAND gate, said fourth input being coupled to said output of said fourth NAND gate, said output providing said fill level signal and said second state signal of said first fill indicator cell.

9. The circuit of claim 8 wherein said first fill indicator cell further includes:

a sixth NAND gate having first and second inputs and an output, said first input receiving said inverted request control signal of said first fill indicator cell, said second input receiving an inverted acknowledge control signal;

a seventh NAND gate having first, second and third inputs and an output, said first input receiving said first state signal of said first fill indicator cell, said second input receiving said inverted acknowledge control signal, said third input receiving a reset control signal; and an eighth NAND gate having first and second inputs and an output, said first input being coupled to said output of said sixth NAND gate, said second input being coupled to said output of said seventh NAND gate, said output providing said first state of said first fill indicator cell.

* * * * *